United States Patent Office 3,591,610
Patented July 6, 1971

3,591,610
ANTHRAQUINONE DYES
Hirohito Kenmochi, Toyonaka-shi, Tatsuo Kanda, Takarazuka-shi, Seiji Hotta, Minoo-shi, and Takashi Akamatsu, Ashiya-shi, Japan, assignors to Sumitomo Chemical Company, Ltd., Osaka, Japan
No Drawing. Filed Aug. 14, 1967, Ser. No. 660,239
Claims priority, application Japan, Aug. 18, 1966, 41/54,615, 41/54,616; Aug. 27, 1966, 41/56,563
Int. Cl. C09b 1/40, 1/52
U.S. Cl. 260—372
2 Claims

ABSTRACT OF THE DISCLOSURE

The novel dyes of the class of reactive anthraquinone dyes and employable for dyeing fiber articles containing nitrogen atom in clear shade with fastnesses.

The present invention relates to a novel reactive anthraquinone dye, a method for producing the same, and a method for dyeing fiber articles in clear shade with the same with fastnesses.

One object of the present invention is to provide a novel reactive anthraquinone dye and another object is to provide a method for producing such dye commercially advantageously with cheaper and easier operation by introducing reactive groups directly into anthraquinone derivatives in one process and in high yield. Other object is to provide a method for dyeing fiber articles in clear shade with such dye.

Further objects will be apparent from the following descriptions.

In order to accomplish these objects the present invention provides novel reactive anthraquinone dyes having the formula,

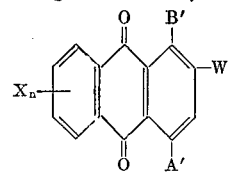

(I)

wherein A represents an aralkylamino radical substituted, to the aryl radical thereof, with a reactive group having the formula, $$-CH_2\overset{R^1}{\underset{|}{N}}COR^2SO_2Z,$$

in which $R^1$ represents a hydrogen atom or a lower alkyl having 1 or 2 carbon atoms, $R^2$ represents a lower alkylene having 1 or 2 carbon atoms and Z represents β-sulfatoethyl or vinyl; B represents a hydroxy, an amino, an alkylamino, a cycloalkylamino or an arylamino or the same aralkylamino radical as identified in A; W represents hydrogen atom or sulfonic acid radical; X represents a halogen atom or sulfonic acid radical; X represents a halogen atom or hydroxyl, acylamino or sulfonic acid radical; and n represents an integer of 0, 1 or 2.

This invention further provides a method for preparing a novel reactive anthraquinone dye having the following formula,

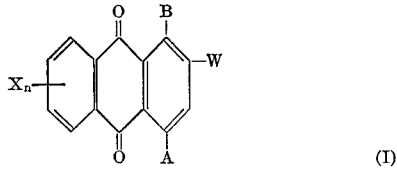

(I)

wherein A, B, W, X and n have the same meanings as identified above, which comprises reacting an anthraquinone derivatives having the formula,

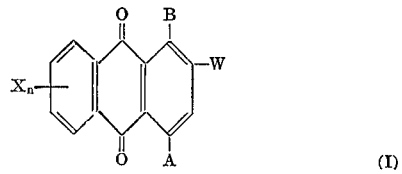

(II)

wherein W, X and n have the same meanings as identified above; A' represents an aralkylamino radical; and B' represents hydroxy, amino, an alkylamino, a cycloalkylamino, an arylamino or an aralkylamino; with a reactive compound having the following general formula, $$YCH_2\overset{R^1}{\underset{|}{N}}COR^2SO_2CH_2CH_2OH \qquad (III)$$

wherein $R^1$ and $R^2$ have the same meanings as identified above and Y represents hydroxy radical or a halogen atom; the said reactive compound being in an amount of 1 to 3 moles per mol of the said anthraquinone derivative, in a 80 to 100% sulfuric acid or a fuming sulfuric acid containing low $SO_3$ concentration at a temperature of 0° to 30° C.; and treating the resulting dye having at least one of $$-CH_2\overset{R^1}{\underset{|}{N}}COR^2SO_2Z'$$

in which $R^1$ and $R^2$ have the same meanings as identified above; and Z' represents β-sulfatoethyl radical; with a weak alkaline aqueous solution to convert the β-sulfatoethyl radical into vinyl radical. This invention also provides a method for dyeing fiber articles containing nitrogen atom, characterized by using the said novel reactive anthraquinone dye.

According to the present invention, the novel reactive anthraquinone dyes are produced advantageously in one process and in high yield, by reacting the reactive compounds represented by the Formula III which is easily obtained in low cost, with the anthraquinone derivatives represented by the Formula II. This is one of the characteristic features of the present invention.

The novel reactive anthraquinone dye of the present invention is exceedingly superior to the known reactive anthraquinone dyes concerning the dyeability, fastnesses and brightness. This is another characteristic feature of the present invention. Anthraquinone derivatives employed in the present invention are characterized by that they are substituted in 4-position or 1 and 4-position of their anthraquinone nucleus with one or two of an aralkylamino radical. The reactive group having the Formula III may be almost quantitatively introduced to the aryl radical of the said aralkylamino radical under a certain reaction condition as mentioned after.

For the aralkylamino radical, it is preferable that the alkyl radical thereof branches off at carbon atom attached to the amino radical or forms a ring and the aryl radical thereof is combined directly or through oxygen or sulfur atom or $-OCH_2-$ with the said branched alkyl or cycloalkyl radical, and may be substituted with methyl or methoxy radicals. More preferably, the said aralkylamino radical has the following formula,

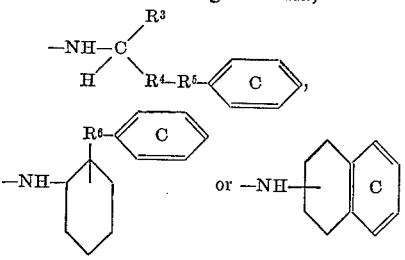

wherein R³ represents a lower alkyl radical having 1 to 6 carbon atoms or

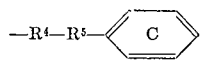

R⁴ represents a lower alkylene radical having 1 to 6 carbon atoms, R⁵ represents oxygen or sulfur atom or —OCH₂— or direct linkage, R⁶ represents oxygen atom, methylene radical or direct linkage, and benzene nucleus C may be substituted with methyl or methoxy radical.

Examples of such aralkylamino radical includes:

1-methyl-2-phenylethylamino
1-methyl-2-phenoxyethylamino
1-methyl-2-benzyloxyethylamino
1-methyl-3-phenylpropylamino
1-methyl-3-(4'-methylphenyl)propylamino
1-isobutyl-3-(2'-methylphenyl)propylamino
1-tert. butyl-3-phenylpropylamino
1-cyclohexyl-3-phenylpropylamino
1-benzyl-2-phenylethylamino
1-(4'-phenylcyclohexyl)ethylamino
4-phenylcyclohexylamino
2-phenoxycyclohexylamino
2-benzylcyclohexylamino
2-(4'-methoxybenzyl)cyclohexylamino
2-(2',4',6'-trimethylbenzyl)cyclohexylamino
4-benzylcyclohexylamino
1,2,3,4-tetrahydro-1-naphthylamino
1,2,3,4-tetrahydro-2-naphthylamino Alkylamino and cycloalkylamino radicals represented by B' in the aforementioned Formula II each has 1 to 6 carbon atoms and examples thereof include:

As alkylamino radical; methylamino, ethylamino, β-hydroxyethylamino, isopropylamino, isobutylamino, and the like.

As cycloalkylamino radical; cyclohexylamino and the like.

Further aryl radical of the arylamino radical represented by B' in the Formula II may be further substituted with methyl or methoxy radical or the like.

Examples of the anthraquinone derivatives substituted with aforementioned radicals includes as follows:

1-hydroxy-4-(1'-methyl-3'-phenylpropylamino)-anthraquinone
1-methylamino-4-(1'-methyl-2'-phenylethylamino)-anthraquinone
1-β-hydroxyethylamino-4-(1'-cyclohexyl-3'-phenylpropylamino)anthraquinone
1-isopropylamino-4-(1',2',3',4'-tetrahydro-2'-naphthylamino)anthraquinone
1-cyclohexylamino-4-(1'-isobutyl-3'-phenylpropylamino)anthraquinone
1-cyclohexylamino-4-(1'-methyl-2'-phenoxyethylamino)-anthraquinone
1-cyclohexylamino-4-(1'-methyl-3'-phenylpropylamino)-anthraquinone-6-sulfonic acid
1-cyclohexylamino-4-[1'-isobutyl-3'-(2''-methylphenyl)-propylamino]anthraquinone-6 or 7-sulfonic acid
1-anilino-4-(1'-methyl-3'-phenylpropylamino)-anthraquinone
1-(4'-methylanilino)-4-(1'''-methyl-3''-phenylpropylamino)anthraquinone
1,4-bis-(1'-benzyl-2'-phenylethylamino)anthraquinone
1,4-bis-(1'-methyl-3'-phenylpropylamino)anthraquinone
1,4-bis-(2'-benzyloxy-1'-methylethylamino)anthraquinone
1,4-bis-[2'-(2'',4'',6''-trimethylbenzyl)-cyclohexylamino]anthraquinone
1,4-bis-[1'-(4''-phenylcyclohexyl)ethylamino]-anthraquinone
1,4-bis-['-methyl-3'-(4''-methylphenyl)propylamino]-anthraquinone
1,4-bis-(1'-methyl-3'-phenylpropylamino)-6-chloroanthraquinone
1,4-bis-(4'-benzylcyclohexylamino)-6,7-dichloro-anthraquinone
1,4-bis-(4'-phenylcyclohexylamino)-6-bromoanthraquinone
1,4-bis-(1'-isobutyl-3'-phenylpropylamino)-5,8-dihydroxyanthraquinone
1,4-bis-(1'-tert.butyl-3'-phenylpropylamino)-5-hydroxyanthraquinone
1,4-bis-(1',2',3',4'-tetrahydro-2'-naphthylamino)-anthraquinone-6-sulfonic acid
1-amino-4-[2'-(4''-methoxybenzyl)cyclohexylamino]-anthraquinone-2-sulfonic acid
1-amino-4-(1'-methyl-3'-phenylpropylamino)anthraquinone-2-sulfonic acid
1-amino-4-(1'-cyclohexyl-3'-phenylpropylamino)-anthraquinone-2-sulfonic acid
1-amino-4-(2'-phenoxycyclohexylamino)anthraquinone-2-sulfonic acid
1-amino-4-(1',2',3',4'-tetrahydro-1'-naphthylamino)-5-acetylamino anthraquinone-2-sulfonic acid
1-amino-4-(2'-benzylcyclohexylamino)anthraquinone-2,8-disulfonic acid Typical examples of the reactive compounds having the Formula III are HOCH₂NHCOCH₂CH₂SO₂CH₂CH₂OH,
HOCH₂NHCOCH₂SO₂CH₂CH₂OH,
ClCH₂NHCOCH₂CH₂SO₂CH₂CH₂OH,
ClCH₂NHCOCH₂SO₂CH₂CH₂OH,
HOCH₂N(CH₃)COCH₂CH₂SO₂CH₂CH₂OH,
HOCH₂N(CH₃3COCH₂SO₂CH₂CH₂OH,
ClCH₂N(CH₃)COCH₂CH₂SO₂CH₂CH₂OH and
ClCH₂N(CH₃)COCH₂SO₂CH₂CH₂OH.

Those reactive compounds may be easily produced, for example.

β(β'-Hydroxyethylsulfonyl)propionyl-N-methylolamide having the formula,

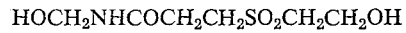

is prepared in good yield by oxidizing β(β'-hydroxyethylmercapto)propionitrile with hydrogen peroxide, and hydrolyzing the oxidation product with alkaline hydrogen peroxide to yield β(β'-hydroxyethylsulfonyl)propionylamide, and then treating the β(β'-hydroxyethylsulfonyl)propionylamide with formaline in a weak aqueous alkaline solution according to the conventional method; and the β(β'-hydroxyethylsulfonyl)propionyl-N - halomethylamide having the formula,

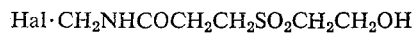

wherein Hal. means chlorine or bromine atoms is prepared easily and advantageously by reacting β(β'-hydroxyethylsulfonyl)propionylamide with symmetrical dichloro- or dibromomethyl ether in sulfuric acid, and the resulting product may be employed to react with the anthraquinone derivative as it is in the solution of sulfuric acid.

The reaction between the reactive compound and the anthraquinone derivatives as described above, is conducted in sulfuric acid preferably in a 80% to 100% sulfuric acid or a fuming sulfuric acid containing low SO₃ concentration. One to three moles of the reactive compound per mole of the anthraquinone derivatives is employed. The reaction temperature range is from 0° to 30° C. and the reaction period of time is in the range of from 1 hour to 20 hours.

The end point of the reaction can be confirmed by the paper chromatography using, for example, as the developing agent a mixture of 3 parts by weight of n-butanol, 1 part by weight of ethanol and 1 part by weight of water. The disappearance of the anthraquinone derivatives in the paper chromatograph shows the completion of the reaction.

After the reaction is over, the reaction mixture is poured on ice water, if necessary, thereafter an inorganic salt such as sodium chloride, potassium chloride and the like is added thereto, thereby to obtain the objective dye as crystals. Further if desired to increase solubility in water, the once recovered dye, after drying and crushing, is further treated with a fuming sulfuric acid containing low $SO_3$ concentation, or the aforementioned reaction mixture is, as it is, added dropwise with a fuming sulfuric acid containing high $SO_3$ concentration.

The prepared dye containing the reactive group of the formula,

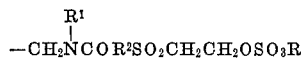

wherein $R^1$ and $R^2$ have the same meanings as identified above and R is a hydrogen atom or an alkali metal, can be easily converted to the dye containing the reactive group of the formula,

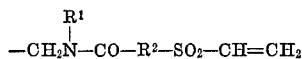

wherein $R^1$ and $R^2$ have the same meanings as identified above by the weak alkali treatment in an aqueous medium at a room temperature.

The reactive compound is not needed to be perfected as the reactive compound having the Formula III, and those which can be used for the production of the reactive compound in sulfuric acid medium under the suitable condition, may be employed in the production of the objective dye.

Concretely speaking, a nitrile, for example, $\beta(\beta'$-hydroxyethylsulfonyl)propionitrile which may be converted in sulfuric acid medium to an acid amide, for example, $\beta(\beta'$-hydroxyethylsulfonyl)propionylamide, may be directly mixed with the anthraquinone derivatives in sulfuric acid medium under the presence of symmetrical dihalomethyl ether or formaldehyde, thereby to obtain the objective dye also in good yield.

Using the thus-obtained reactive anthraquinone dye which contains at least one of the reactive group having the Formula III, dyeing can be effected as described below with high fastnesses.

As the fiber materials which can be dyed with the reactive dyes of the present invention, nitrogen containing fibers, such as wool, silk, polyamide and polyurethane fibers are given, and these fibers are dyed in clear violet to blue shade with the reactive dyes of the present invention, in general, in an acidic bath, or neutral bath, and if necessary in conjunction with alkaline treatment, thereby fixing the dye, with extreme fastness to light and especially to moisture.

The method for dyeing nitrogen containing fiber articles will be illustrated as follows:

The dyeing is conducted at a liquid ratio of from 1:20 to 1:100 at a temperature of from 50° to 100° C. preferably of from 90° to 100° C. for a period of time of from 1 to several hours using as an auxiliary agent, those materials usually employed for the dyeing of nitrogen containing fiber articles for the purpose of accelerating the absorption of dye, such as ammonium acetate, ammonium sulfate, sodium dihydrogen phosphate, sodium sulfate, acetic acid and formic acid.

Nonionic surface active agents such as polycondensation product of ethylene oxide with an amine, an alcohol or a phenol having substituted alkyl radical can be suitably added to the bath for the purpose of preventing spots dyeing, so-called skitteriness.

And, alkaline treatment can be conducted, if necessary, by adding on or before dyeing to the bath an alkaline material such as sodium bicarbonate, trisodium phosphate, urotropin and the like.

The present invention will be illustrated more concretely with reference to the following examples, which are given by way of illustration and not by way of limitation. All parts and percents are by weight.

EXAMPLE 1

Five point zero parts of 1,4-bis-(1'-methyl-3'-phenylpropylamino)anthraquinone is dissolved to 40 parts of 85% sulfuric acid and 3.2 parts of $\beta(\beta'$-hydroxyethylsulfonyl)propionyl-N-methylolamide is added thereto.

The mixture is stirred for 1 hour at temperature of 10° C. and thereafter subjected to sulfonation by dropwise addition of 30 parts of 65% fuming sulfuric acid while being cooled with ice. The reaction mixture is poured on 400 parts of ice water containing 40 parts of sodium chloride precipitating crystals, which are separated by filtration and washed with aqueous 15% sodium chloride solution.

The resulting wet crystals are suspended in aqueous 15% sodium chloride solution and the mixture is neutralized by addition of sodium carbonate, obtaining clear blue dye.

EXAMPLE 2

Five point nine parts of 1-cyclohexylamino-4-[1'-isobutyl - 3'-(2''-methylphenyl)propylamino]anthraquinone-6- or 7-sulfonic acid is dissolved in 60 parts of 90% sulfuric acid at a temperature of below 10° C. and 2.1 parts of $\beta$-hydroxyethylsulfonylaceto-N-methylolamide is added thereto.

The mixture is stirred for 5 hours at a temperature of 10° to 15° C. and thereafter poured on 300 parts of ice water containing 30 parts of sodium chloride, then precipitating crystals, which are separated by filtration and washed with aqueous 10% sodium chloride solution. The resulting wet crystals are suspended in aqueous 10% sodium chloride solution and the mixture is neutralized by addition of sodium carbonate obtaining clear greenish blue dye.

EXAMPLE 3

Five point two parts of 1-amino-4-[2'-(4''-methoxybenzyl)cyclohexylamino]anthraquinone-2-sulfonic acid is dissolved in 50 parts of 90% sulfuric acid at a temperature of below 10° C. and 2.3 parts of $\beta$-($\beta'$-hydroxyethylsulfonyl)propionyl-N-chloromethyl amide is added thereto.

The mixture is stirred for 10 hours at a temperature of 15° to 20° C. and thereafter subjected to sulfonation by dropwise addition of 30 parts of 65% fuming sulfuric acid while being cooled with ice.

The reaction mixture is poured on 400 parts of ice water containing 40 parts of sodium chloride, then precipitating crystals, which are separated by filtration and washed with aqueous 10% sodium chloride solution.

The resulting wet crystals are suspended in aqueous 15% sodium chloride solution and the mixture is adjusted to pH 9 and kept for 1 hour while being stirred, then obtaining clear reddish blue dye.

EXAMPLE 4

Five point four parts of 1,4-bis-(1'-methyl-3'-phenylpropylamino)-5,8-dihydroxyanthraquinone is dissolved in 50 parts of 90% sulfuric acid and 3.2 parts of $\beta$-($\beta'$-hydroxyethylsulfonyl)propionitrile is added thereto and after 1 hour stirring 0.4 part of paraformaldehyde is further added thereto.

The reaction mixture is stirred for 15 hours at a temperature of 10° to 15° C. and successively subjected to sulfonation by addition of 30 parts of 65% fuming sulfuric acid while being cooled with ice.

The reaction mixture is poured on 400 parts of ice water containing 40 parts of sodium chloride, then precipitating crystals, which are separated by filtration and washed with aqueous 10% sodium chloride solution. The resulting wet crystals are suspended in aqueous 15% sodium chloride solution and the mixture is neutralized by addition of sodium carbonate, then obtaining clear greenish blue dye.

EXAMPLE 5

Using 3.4 parts of β-(β'-hydroxyethylsulfonyl)-propionyl-N-methyl-N-methylolamide or 3.4 parts of β-hydroxyethylsulfonylaceto-N-ethyl-N-methylolamide instead of 3.2 parts of β-(β'-hydroxyethylsulfonyl)propionyl-N-methylolamide in Example 1, the same dye as in Example 1 is also obtained according to the same way as in Example 1.

A dye which gives a following shade on fiber articles is obtained by treating a following anthraquinone derivatives instead of 5.0 parts of 1,4-bis-(1'-methyl-3'-phenylpropylamino)anthraquinone according to the same way as in Example 1.

| Example No. | Part | Anthraquinone derivatives | Shade on fiber article |
|---|---|---|---|
| 6 | 4.1 | 1-isopropylamino-4-(1', 2', 3', 4'-tetrahydro-2'-naphthylamino) anthraquinone. | Blue. |
| 7 | 4.5 | 1-cyclohexylamino-4-(1'-methyl-2'-phenoxyethylamino)-anthraquinone. | Do. |
| 8 | 4.5 | 1-anilino-4-(1'-methyl-3'-phenylpropylamino)-anthraquinone. | Greenish blue. |
| 9 | 6.1 | 1,4-bis-[1'-(4''-phenylcyclohexyl)ethylamino]anthraquinone. | Do. |
| 10 | 6.5 | 1,4-bis-(4'-benzylcyclohexylamino)-6,7-dichloroanthraquinone. | Do. |
| 11 | 6.3 | 1,4-bis-(1'-benzyl-2'-phenylethylamino)-anthraquinone. | Do. |
| 12 | 3.7 | 1-hydroxy-4(1'-methyl-3'-phenylpropylamino)anthraquinone. | Violet. |

A dye which gives a following shade on fiber articles is obtained by treating a following anthraquinone derivatives instead of 5.9 parts of 1-cyclohexylamino-4-[1'-isobutyl - 3'-(2''-methylphenyl)propylamino]anthraquinone-6- or 7-sulfonic acid according to the same way as in Example 2.

| Example No. | Part | Anthraquinone derivatives | Shade on fiber article |
|---|---|---|---|
| 13 | 2.9 | 1,4-bis-(1',2',3',4'-tetrahydro-2'-naphthylamino)anthraquinone-6-sulfonic acid. | Greenish blue. |
| 14 | 5.5 | 1-amino-4-(1'-cyclohexyl-3'-phenylpropylamino)-anthraquinone-2-sulfonic acid. | Reddish blue. |
| 15 | 4.8 | 1-amino-4-(1',2',3',4'-tetrahydro-1'-naphthylamino)-5-acetylaminoanthraquinone-2-sulfonic acid. | Greenish blue. |
| 16 | 5.7 | 1-amino-4-(2'-benzylcyclohexylamino)-anthraquinone-2,8-disulfonic acid. | Do. |

EXAMPLE 17

Two-tenth part of the dye obtained in Example 1 is dissolved in 200 parts of water, and 0.2 part of acetic acid and 0.2 part of a nitrogen containing nonionic surface active agent, that is a polycondensation product of an alkylamine with ethylene oxide, are added thereto. Ten parts of wool is immersed in the thus prepared dyeing bath and heated up to 95° C. After 10 minutes, 0.1 part of formic acid is added to the bath.

The temperature is kept at that level for additional 50 minutes, thereby to finish the dyeing. Finally the wool is rinsed in cold water and dried. The clear blue wool is obtained having an excellent fastness to washing.

EXAMPLE 18

Two-tenth part of the dye obtained in Example 2 is dissolved in 200 parts of water and 0.1 part of acetic acid is added thereto.

Ten parts of wool is dipped in the thus prepared dyeing bath and heated up to 95° C.

After 10 minutes, 0.1 part of formic acid is added to the dyeing bath.

The temperature is kept at that level for an additional 50 minutes, thereby to finish the dyeing. Finally the wool is rinsed in cold water and dried. The clear reddish blue wool is obtained having an excellent fastness to washing.

What we claim is:

1. A novel reactive anthraquinone dye having the formula,

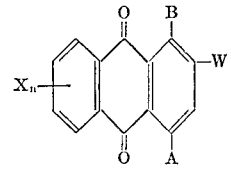

wherein A represents an aralkylamino radical having the formula,

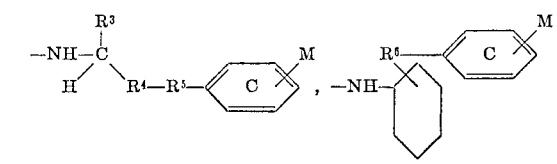

or

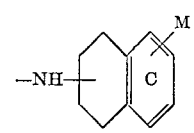

wherein $R^3$ represents a lower alkyl radical having 1 to 6 carbon atoms or

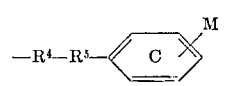

$R^4$ represents a lower alkylene radical having 1 to 6 carbon atoms; $R^5$ represents oxygen atom or —$OCH_2$— or direct linkage; $R^6$ represents oxygen atom, methylene radical or direct linkage, benzene nucleus C may be substituted with methyl, methoxy or sulfonic acid radical; and M represents a reactive group having the formula,

in which $R^1$ represents hydrogen atom or a lower alkyl radical having 1 or 2 carbon atoms, $R^2$ represents a lower alkylene radical having 1 or 2 carbon atoms and Z represents β-sulfatoethyl or vinyl radical; B represents hydroxy, amino, an alkylamino, a cycloalkylamino or an arylamino radical or the same aralkylamino radical as identified in A; W represents hydrogen atom or sulfonic acid radical; X represents a halogen atom or hydroxy, acylamino or sulfonic acid radical; and n represents an integer of 0, 1 or 2.

2. The compound obtained by sulphonating a compound of the formula

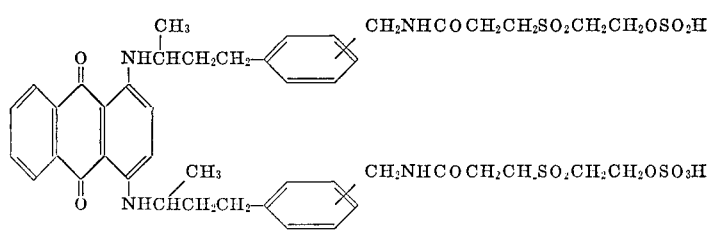

(References on following page)

References Cited

UNITED STATES PATENTS

| | | | |
|---|---|---|---|
| 3,206,483 | 9/1965 | Guenthard et al. | 260—372 |
| 3,431,285 | 3/1969 | Schwander et al. | 260—372 |

FOREIGN PATENTS

| | | | |
|---|---|---|---|
| 661,532 | 7/1965 | Belgium | 260—372 |

LEWIS GOTTS, Primary Examiner

E. J. SKELLY, Assistant Examiner

U.S. Cl. X.R.

8—39